United States Patent [19]

Leventer et al.

[11] 4,380,027
[45] Apr. 12, 1983

[54] DATA ENCODING FOR TELEVISION

[76] Inventors: William Leventer, 62 Sutton Pl., Lawrence, Long Island, N.Y. 11559; Lawrence M. Shulman, 74 Mercury Ave., East Patchogue, N.Y. 11772

[21] Appl. No.: 213,915

[22] Filed: Dec. 8, 1980

[51] Int. Cl.³ .............................................. H04N 7/08
[52] U.S. Cl. .................................... 358/147; 358/142
[58] Field of Search .................................. 358/11–13, 358/141, 143, 147, 146, 142; 370/111

[56] References Cited

U.S. PATENT DOCUMENTS 3,781,818 12/1973 Pardoe ................................. 370/111
4,218,697 8/1980 Leventer ............................. 358/147
4,303,941 12/1981 Marti .................................. 358/147

FOREIGN PATENT DOCUMENTS 2000419 1/1979 United Kingdom .
1562381 3/1980 United Kingdom .

OTHER PUBLICATIONS

An Integrated Teletext and Viewdata Receiver, Insam et al., Conf. Inter. Broadcasting Convention, Sep. 1976, pp. 113–116.

Primary Examiner—Michael A. Masinick
Attorney, Agent, or Firm—Toren, McGeady and Stanger

[57] ABSTRACT

A system for encoding digital data to be transmitted by way of the scan lines of a television video signal includes interface circuitry for receiving data from a number of input devices each operating at a particular data rate, and encoding processing circuitry which takes the data received by the interface circuitry and arranges it into separate data groups wherein each group corresponds to the particular input device which originated the data. The data groups are then inserted, with the aid of timing circuitry, into corresponding data channels defined in a selected scan line of the video signal. Accordingly, the system makes efficient use of the allowable bandwidth of the video signal by allowing data originating from a higher data rate device to be inserted into the same scan line which carries information originating from a lower data rate device.

29 Claims, 10 Drawing Figures

BLOCK DIAGRAM
ENCODER

BLOCK DIAGRAM
ENCODER
FIG. 1

BLOCK DIAGRAM DECODER
FIG. 7

FIG. 10 VIDEO DATA EXTRACTOR

DATA ENCODING FOR TELEVISION

BACKGROUND OF THE INVENTION

The present invention relates generally to data transmission systems, and more particularly to systems which encode digital data onto the scan lines of a television video signal.

It is commonplace today for information to be transmitted over great distances by cable and by radio including satellite relay. Television programs originating in other countries are routinely made available to viewers in this country by way of local ground stations which receive the programs by a microwave relay link including a satellite, and distribute the received signals over a cable in a form which can be reproduced over the viewer's television receiver.

The present availability of means for distributing television signals nearly instantaneously all over the world has given rise to a number of systems for disseminating data in digital form along with the television signals, e.g., during the vertical blanking interval between each scanned video field, so that information other than the video signal can be received by private users. Such information may include news wire service, weather maps or any other information which has previously been distributed only by wire or relatively short radio paths. Examples of these systems include the French DIDON Transmission System, the British Teletext System, and the Canadian Telidon Terminal.

All of the above systems are known as "transparent" in that they provide a faithful replica of digital data originating from an input device (e.g., teletype, computer output) at one end of the communications path to a suitable output device (e.g., teletype, video terminal) at the other end of the path. Further, these systems use a standard television signal as the transmission medium. The basic encoding of the data in the television signal is carried out in synchronism with the horizontal repetition rate of the video scan lines within the signal.

Due to the inherently wide bandwidth of television signals, they have proven to be quite capable as a medium for transmitting high speed data. However, in the event a relatively low speed input device is used, and the data or information rate of that device is to be left unaltered for transmission, the known systems are then under-utilized since, during a fixed time interval in which a large amount of digital information can be encoded onto the television signal, only a relatively small amount of data has been provided by the input device and only that data is encoded by the system onto the television signal. Further, in the event two or more input devices are used in the known systems, data from only one of the devices is encoded into a given video scan lines at one time. For example, in the DIDON system, a packet address is encoded at the beginning of each scan line to identify a particular input device and, thus, to allow the encoded data to be routed to the proper receiving terminal. This allows 256 possible data channels to be handled by the DIDON system for vertical interval transmission, and up to 4,096 possible data channels in the event the DIDON system is used in a full-field mode. Each of the data channels, therefore, occupies at least an entire scan line since the packet address of that line operates to distribute the encoded data only within that channel. Use of a relatively low speed data input device thus would cause a great number of scan lines to be transmitted each beginning with the packet address associated with the channel of the device, but each having substantially less than the total amount of digital data which can be encoded on the line. Time which could otherwise have been allocated to the transmission of higher speed data is therefore lost as long as the lower speed device continues to transmit its data.

SUMMARY OF THE INVENTION

The present invention overcomes the above and other shortcomings in the prior data transmission systems by providing input interface means for receiving data from a number of input devices wherein each device provides data at a particular information rate, and encoding processing means for accessing data received by the input interface means and for arranging the data into separate data groups. Each of the data groups then corresponds to the input device which originated the data in that group. Inserting means coupled to the processing means and to an incoming video signal inserts the data groups into a selected scan line of the video signal, and timing means within the inserting means serves to define a number of data channels over a portion of the selected scan line so that the inserting means inserts each of the data groups into an associated channel. Any selected one of the data channels on the selected scan line then includes data which originates from a particular input device.

In one embodiment, means are included for inserting the latest data group associated with a given input device, in the event such data group exceeds the capacity of the scan line data channel associated with the device, into a "catch-up" data channel defined by the timing means on the same scan line. This compensates for synchronization error between the field rate of the television signal and the clock generator of the timing means.

For a better understanding of the present invention, reference is made to the following description and accompanying drawing, while the scope of the present invention will be pointed out in the appended claims.

DETAILED DESCRIPTION OF THE INVENTION

Figure 1:
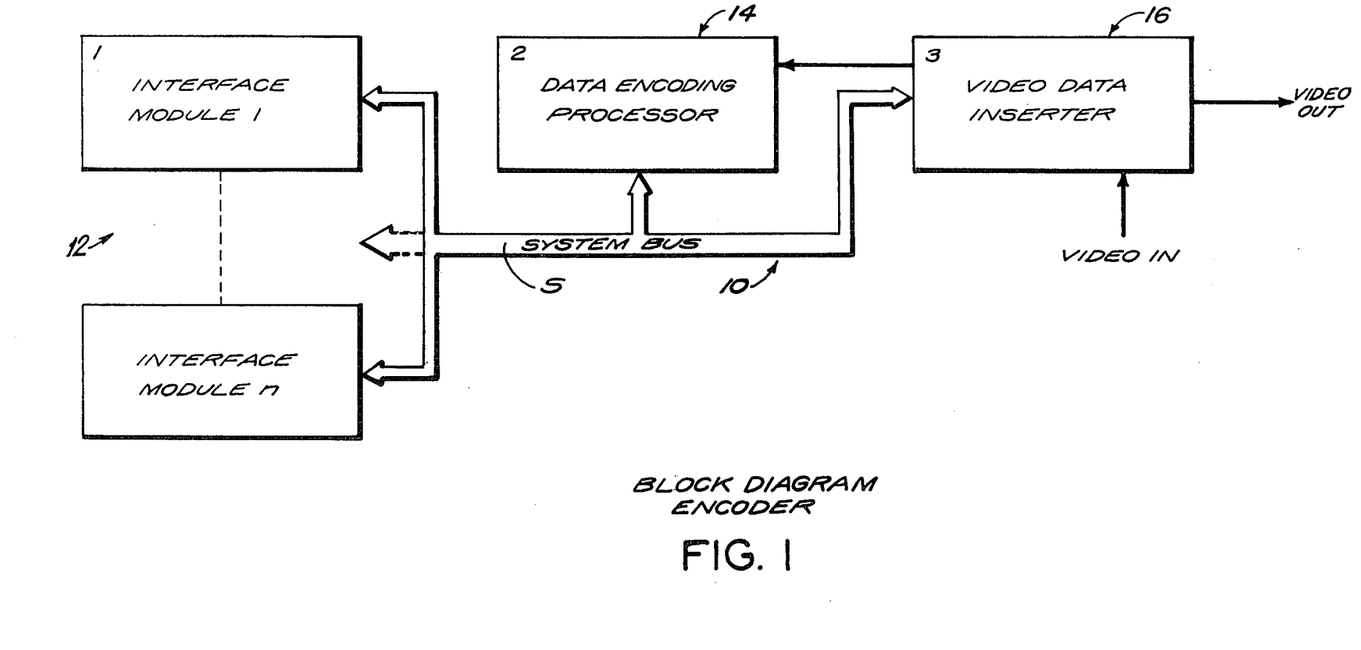
FIG. 1 is a block diagram of a data encoding system according to the present invention.
Figure 2:
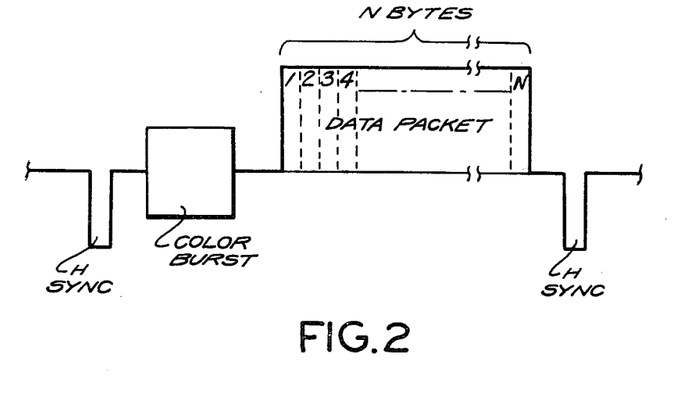
FIG. 2 is a representation of a scan line in a television video signal including a data packet according to the invention.

FIG. 2 represents a single scan line of a television video signal including a color burst, and a data packet including a number N of bytes of digital data which can be inserted into the scan line in the format shown by the system 10 of FIG. 1. The color burst of the scan line of FIG. 2 need not be present, inasmuch as the present system 10 will operate equally satisfactorily with monochrome television transmission systems. The scan line need only include signals such as the horizontal synchronization pulses H SYNC which are time related to the field rate of the television signal itself.

The encoding system 10 of FIG. 1 basically comprises an input interface portion 12, a data encoding processing portion 14, and a data inserting portion 16.

The input interface portion 12 serves to translate the level and, if necessary, the form of data supplied by a device on an input data line I (FIG. 4) into a format that can be accommodated by the encoding processing portion 14. As explained below, the input interface portion 12 enables many different formats of information to be handled by the system 10.

The data encoding processing portion 14 operates to interpret information supplied to it by data lines from the input interface portion 12, and places this data in a format that is suitable for transmission in a television video signal. Encoding processing portion 14 also controls the sequence in which the data is received from the input interface portion 12, and correctly positions this data within the selected video signal scan line.

The data inserting portion 16 receives the video signal into which data is to be encoded by the system 10, synchronizes the system to the video signal, selects the area (e.g., a certain scan line) of the video signal into which the data is to be inserted, and receives the data from the encoding processing portion 14 for insertion into the video signal. The properly encoded video signal is then provided by the inserting portion 16 for subsequent transmission by, for example, cable or a conventional television broadcast transmitter.

Figure 4:
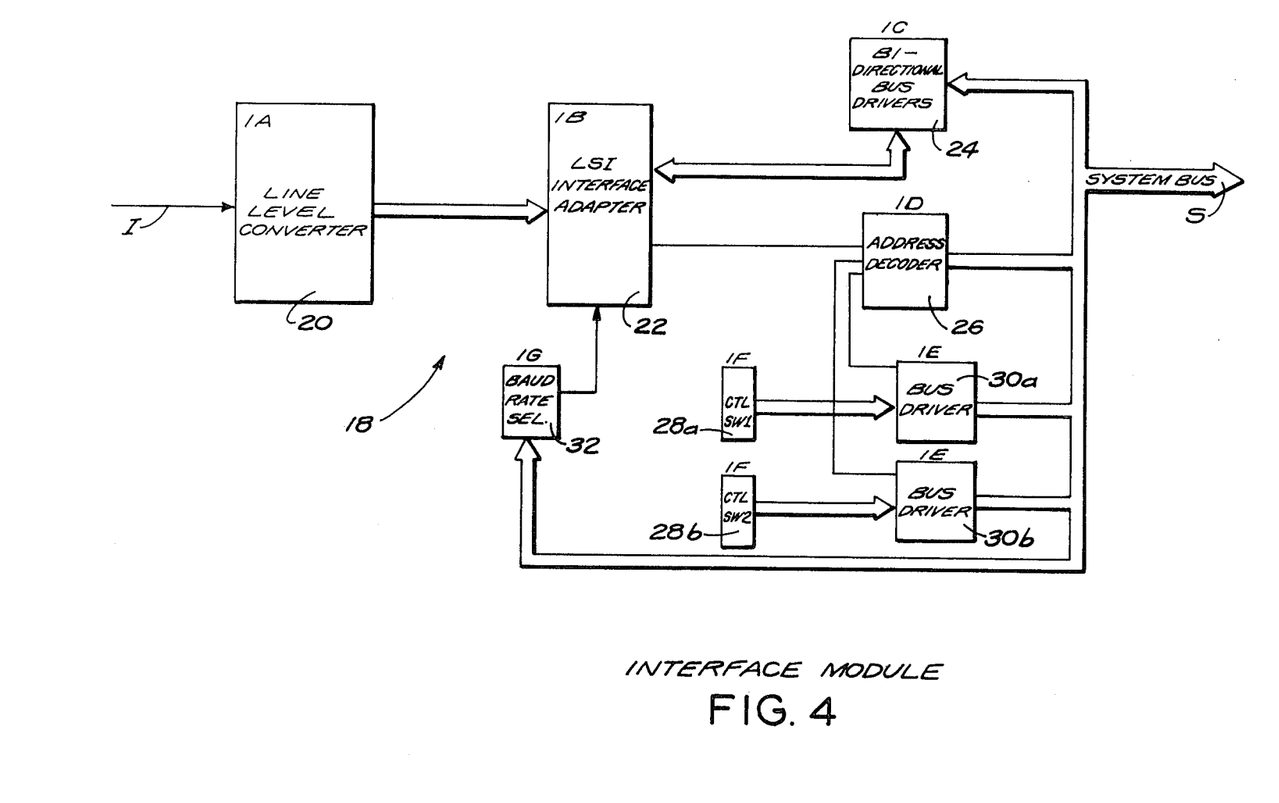
FIG. 4 is a block diagram of an interface module included in the encoding system of FIG. 1.
Figure 5:
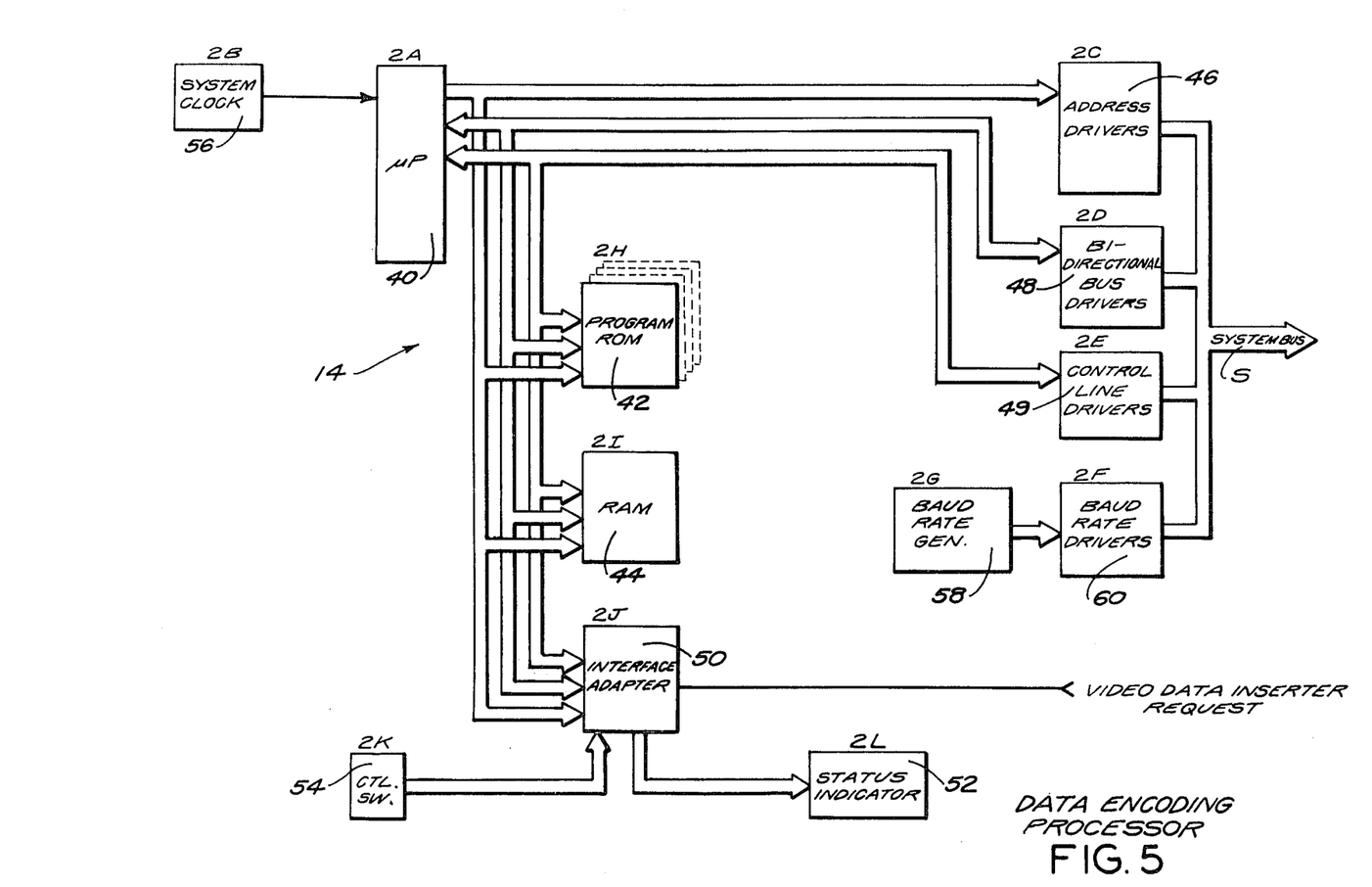
FIG. 5 is a block diagram of a data encoding processor included in the encoding system of FIG. 1.

FIG. 4 is a detailed representation of an interface module 18, a number of such modules together forming the input interface portion 12 of the system 10. Interface module 18 is arranged to accept input data at TTL level, and to re-format either a serial stream or parallel data into a form that can be applied to system bus S which couples with a microprocessor 40 in the encoding processing portion 14 (FIG. 5).

Each interface module 18 includes a line level converter 20 which translates the level from the incoming data line I to a TTL level at which an LSI interface adapter 22 coupled to the line level converter 20 can operate. A typical device for the line level converter 20 is Motorola type MC1489. The LSI interface adapter 22 may be, for example, type 6821 (for parallel data), type 6850 (for serial 8-level data), or type AY5-1013UART (5-8 level serial data).

Input line I may be, for example, an RS 232C compatible line, a 20 mil current loop, a 60 mil current loop, or several other standard configurations currently available. Line level converter 20 may not be required when the data on the input line I is provided in parallel TTL levels, in which event a line buffer may be used in its place to protect the LSI interface adapter 22.

Once data enters the LSI interface adapter 22, the adapter 22 generates an interrupt to the microprocessor 40 in the encoding processing portion 14 (FIG. 5) so that the microprocessor would then cause data to be taken from the adapter 22 by way of bi-directional bus drivers 24 and address decoder 26. Bus drivers 24 and address decoder 26 together determine when the microprocessor wants to access the particular interface module 18 with which these devices are associated, and allow data and address information to be exchanged between the particular interface module 18 and the microprocessor of the encoding processing portion 14. A typical device for bus driver 24 is type 8T26, and for address decoder 26, type 74LS138.

Each interface module 18 also contains a bank of control switches 28a, 28b. These switches serve to define the "personality" of the interface module 18 with which they are associated, that is, items such as the number of bits used in an incoming data character, the rate at which the incoming data is supplied, the type of port being configured (either serial or parallel), and other items which may be of importance at a later date.

Switches 28a, 28b also have associated bus drivers 30a, 30b to interface the switches with the system bus S. Bus drivers 30a, 30b are controlled by the address decoder 26 to allow the microprocessor of encoding processing portion 14 to selectively interrogate the switches 28a, 28b. Bus drivers 30a, 30b can be, for example, device type 8T97 or type 81LS95.

Finally, each interface module 18 includes a baud rate selector 32 which is arranged to provide the correct clock rate to the LSI interface adapter 22 so that the proper baud rate can be selected to synchronize with the incoming data line I.

Figure 6:
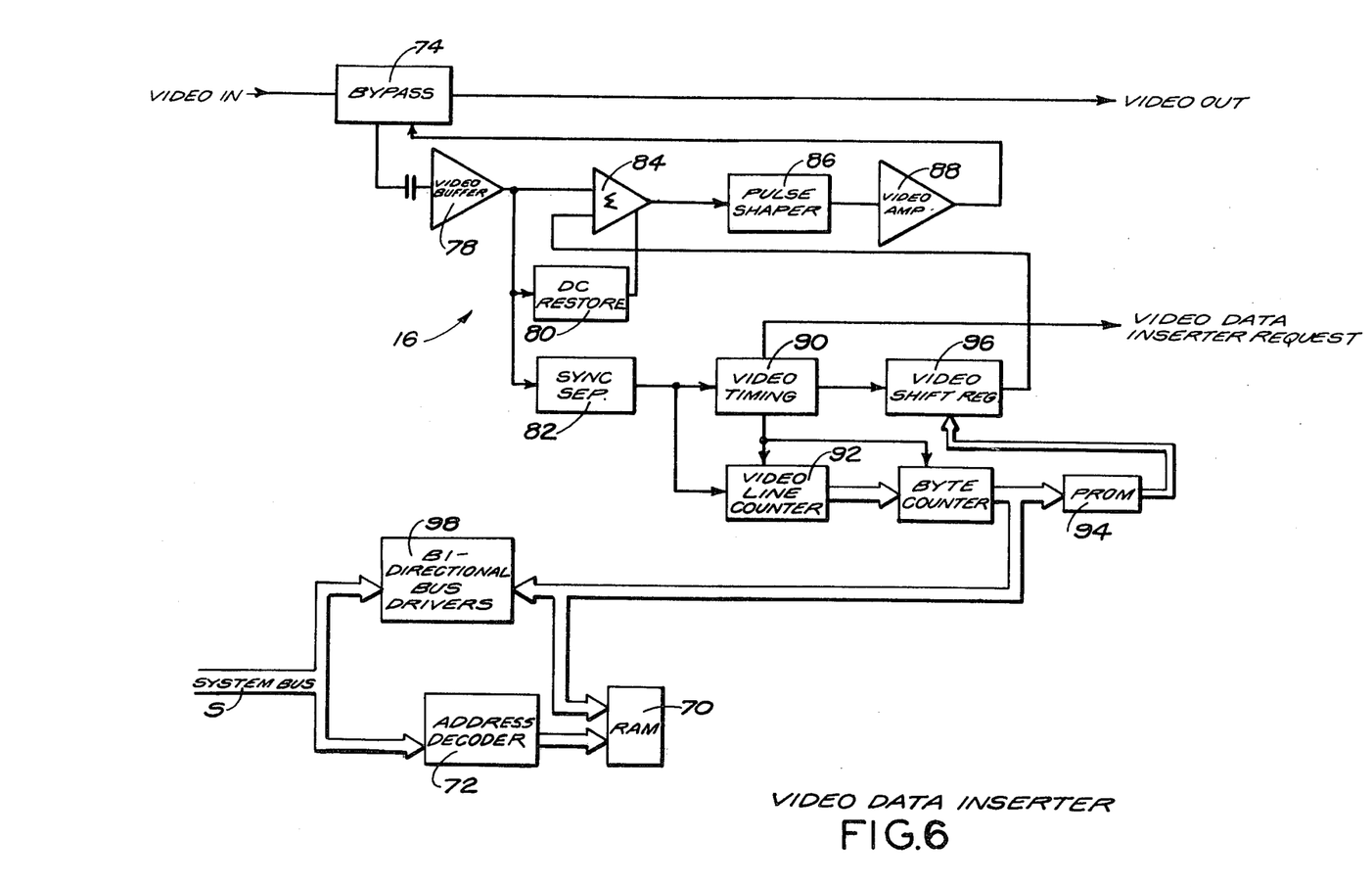
FIG. 6 is a block diagram of a data inserter included in the encoding system of FIG. 1.

FIG. 5 is a detailed representation of the data encoding processing portion 14 of the system 10. This portion extracts the data from each interface module 18, and properly formats it for delivery at the appropriate time to the data inserting portion 16 (FIG. 6).

The particular operations carried out by the data encoding processing portion 14, as well as the entire encoding system 10, are performed by microprocessor 40 which may be, for example, Motorola type 6809. Instructions which are followed by the microprocessor 40 while performing its various operations are dictated by program ROM 42 which can be, for example, device type 2716 (E-PROM) or type 2316.

A "scratch pad" RAM 44, such as device type 2114, is coupled to the microprocessor 40 for storing intermediate or final values calculated by the microprocessor 40 during its operations. RAM 44 also serves as temporary storage for data acquired by the microprocessor 40 from each interface module 18. That data remains stored in RAM 44 until the data inserting portion 16 requests an update for data to be encoded in a subsequent transmission. At that time, microprocessor 40 retrieves the data from RAM 44 and transfers it through address drivers 46 and bi-directional bus drivers 48 to an appropriate portion of another RAM 70 contained within the data inserting portion 16 (FIG. 6), so that the data will be properly positioned within the data bit time slots allocated to the next video signal scan line.

Also included in the data encoding processing portion 14 of FIG. 5 is an interface adapter 50. Interface adapter 50 serves a number of purposes including handling of each interrupt generated by the data inserting portion 16 by which the request for an update of data is initiated. Adapter 50 additionally drives status indicators 52 which indicate error conditions and data flow, and interrogates control switches 54 which define the "personality" of the processing portion 14. Timing of operations carried out by the processing portion 14 is governed by a clock 56 which is directly coupled to the microprocessor 40, and by a baud rate generator 58 which, together with baud rate drivers 60, determine the baud rates to be provided on the system bus S, which rates are then coupled to the interface modules 18.

A typical device for the address drivers 46 and control line drivers 49 is type 8T97, and bi-directional bus drivers 48 can be device type 8T26. Interface adapter 50 can be, for example, device type 6821; baud rate generator 58—device type MC14411; and baud rate drivers 60—device type 7407.

FIG. 6 is a detailed representation of the data inserting portion 16 of the present encoding system 10. Data inserting portion 16 includes a buffer RAM 70 for receiving the data supplied by the data encoding processing portion 14 through the system bus S, and for inserting that data in a pulse stream in the appropriate data bit time slots allocated to a selected scan line of the video signal supplied to the system 10. RAM 70 can be, e.g., device type 2114, and its associated address decoder 72 may be device type 74LS138.

Data inserting portion 16 basically comprises an analog area which handles all video signal functions, and a digital area which formats or arranges the digital data stored in the RAM 70 into the data stream to be inserted in the video signal scan line.

Within the analog area of the data inserting portion 16 is a bypass 74 to which is applied the video signal to be encoded. Bypass 74 is arranged to provide a "failsafe" feature should the present system 10 lose power or develop some other problem that causes it to distort the incoming video signal, that is, the video signal will pass through the system 10 completely unaltered.

Under normal operating conditions, the video input signal is AC coupled to a video buffer amplifier 78 such as device type LM359. Amplifier 78 establishes a suitable amplitude for the video signal so that it can be processed by the remainder of the data inserting portion 16. The output from the amplifier 78 is coupled to a conventional DC restore circuit 80 which adjusts the DC level of the video input signal to ensure proper handling and processing of the signal by the rest of the circuitry. Specifically, the restore circuit 80 maintains a constant DC level as the average level of the video input signal changes. This is done to facilitate recovering the synchronization pulses which are provided in the incoming video signal.

The output of the amplifier 78 is also coupled to a conventional sync separator 82. Separator 82 derives the horizontal and vertical synchronization pulses from the video input signal so that the circuitry of the entire system 10 can be synchronized to the timing of the video input signals themselves, and so that the data originating from each input interface module 18 will be inserted in the desired time frame or scan line of the video signal.

The output of amplifier 78 additionally is coupled to a summing amplifier 84 such as, e.g., device type LM359. Summing amplifier 84 operates to receive a digital pulse stream supplied by the digital area of the data inserting portion 16 and actually key this information into the video signal. A conventional pulse shaper 86 coupled to the output of the summing amplifier 84 shapes the digital pulses of the pulse stream so that they do not interfere with the operation of a television receiver which is receiving the encoded video signal, but is not extracting the information encoded in the signal by the system 10.

The output from the pulse shaper 86 is applied to a video output amplifier 88 such as, for example, device type LM359. Amplifier 88 enables the incoming video signal including the shaped pulses of data inserted in the signal to be coupled into a conventional 75 ohm load such as a cable system.

The digital area of the data inserting portion 16 receives the data supplied by the data encoding processing portion 14, and includes the RAM 70 which stores that data at appropriate times. This timing is controlled by video timing logic 90 which is coupled to the output of the sync separator 82. A conventional video line counter 92 is arranged to count scan lines within the video signal and, at the proper time, to generate a flag for signaling the insertion of the data. Therefore, the video timing logic 90 and line counter 92 not only ensure that the data is inserted in the proper portion of the scan line, but also that additional information contained in a program ROM 94 (e.g., device type 5610), which information may be a "header" for identifying the source of the encoded information, is encoded into the scan line in front of the data held in the RAM 70. This header information, discussed further below, is also required to enable decoding equipment at a receiving location to synchronize its operations so that the data encoded by the system 10 is eventually routed to the proper receiving terminal.

Video timing logic 90 is also coupled to a video shift register 96 which provides the serial stream of data bits which are provided to the summing amplifier 84 for insertion in the selected scan line of the incoming video signal.

Video timing logic 90 also generates the interrupt to the data encoding processing portion 14 whenever the data inserting portion 16 requires a data update. In so doing, it enables the address decoders 72 and bi-directional bus drivers 98 so that the microprocessor 40 (FIG. 5) has access to the RAM 70 through the system bus S. At other times, video timing logic 90 inhibits the microprocessor 40 from accessing RAM 70, and RAM 70 is then controlled by the circuitry within the data inserting portion 16 to enable insertion of the data from the RAM 70 into the selected scan line of the video signal. Incidentally, the bi-directional bus drivers 98 for the data inserting portion 16 may also be, e.g., device type 8T26.

The video output signal supplied by the data inserting portion 16 thus includes the originally supplied video portion along with any video or other information originating with the signal, and the digital information that was provided onto each input data line I associated with each interface module 18 (FIG. 4), the latter data being inserted in the selected scan line of the video signal.

This newly formed composite video signal may then be supplied to a conventional television broadcast transmitter (not shown) to be modulated and transmitted as a radio signal through a microwave link over ground or through a satellite, and received at a remote location at which the inserted data can be recovered and converted back to its original form for display or other processing. Of course, instead of modulating a television transmitter, the video output signal from the data inserting portion 16 may be transmitted entirely along a conventional cable system so that only certain users who have access to the cable system can recover the data inserted by the system 10.

Figure 7:
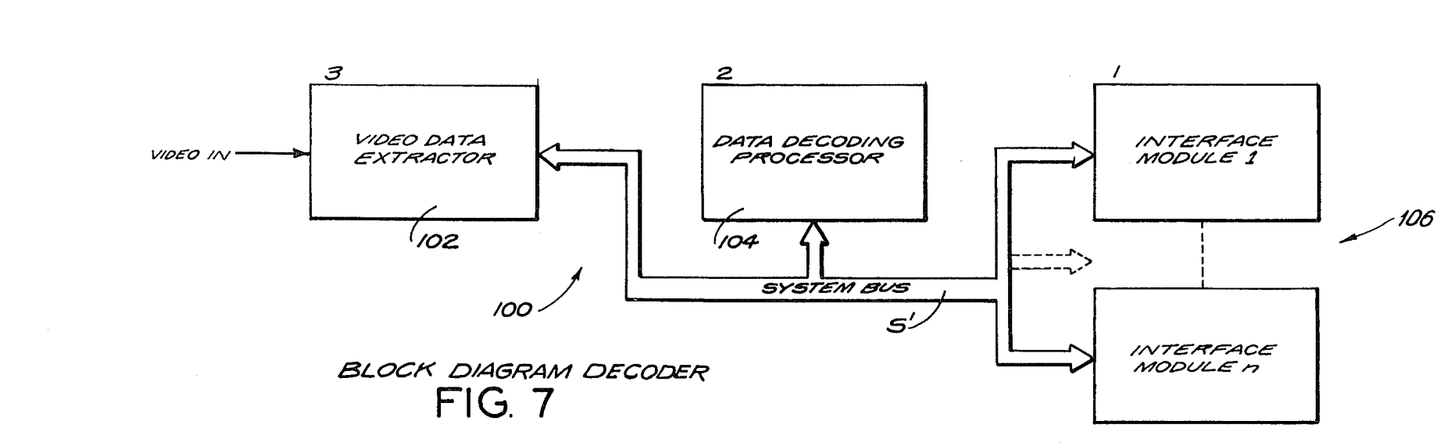
FIG. 7 is a block diagram of a data decoding system according to the present invention.
Figure 8:
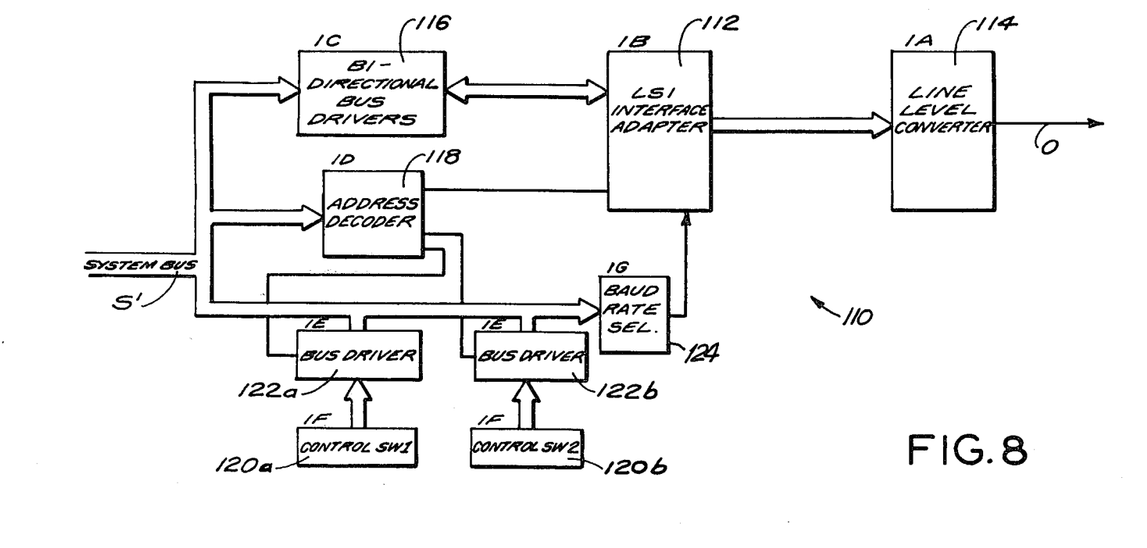
FIG. 8 is a block diagram of an interface module included in the decoding system of FIG. 7.

FIGS. 7-10 illustrate a decoding system 100 which can be used at the receiving location to recover the inserted data and route it to the proper receiving terminals. Decoding system 100 includes three major portions, namely, a data extracting portion 102, a data decoding processing portion 104, and an output interface portion 106, as shown in FIG. 7.

Figure 9:
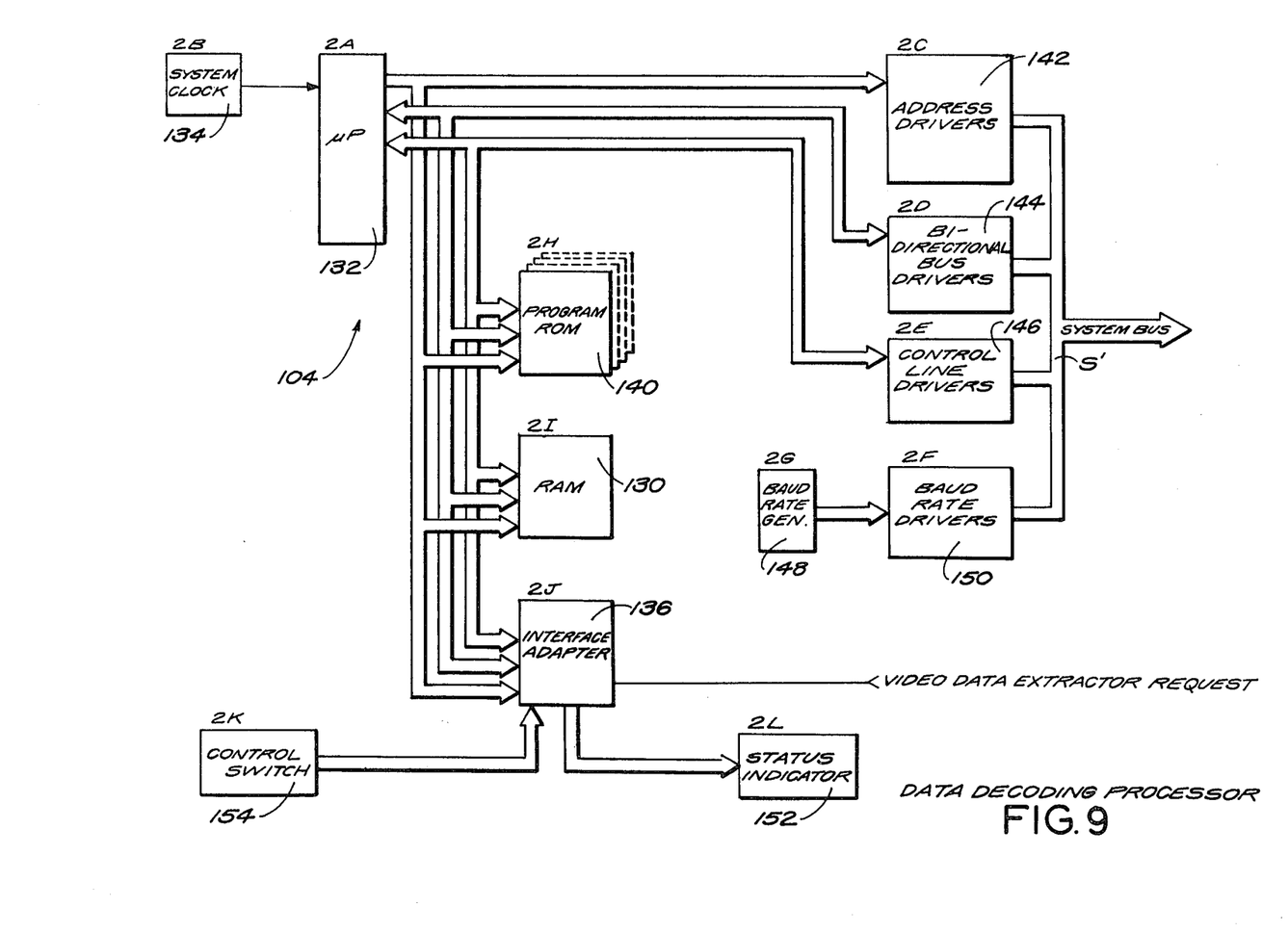
FIG. 9 is a block diagram of a data decoding processor included in the decoding system of FIG. 7.
Figure 10:
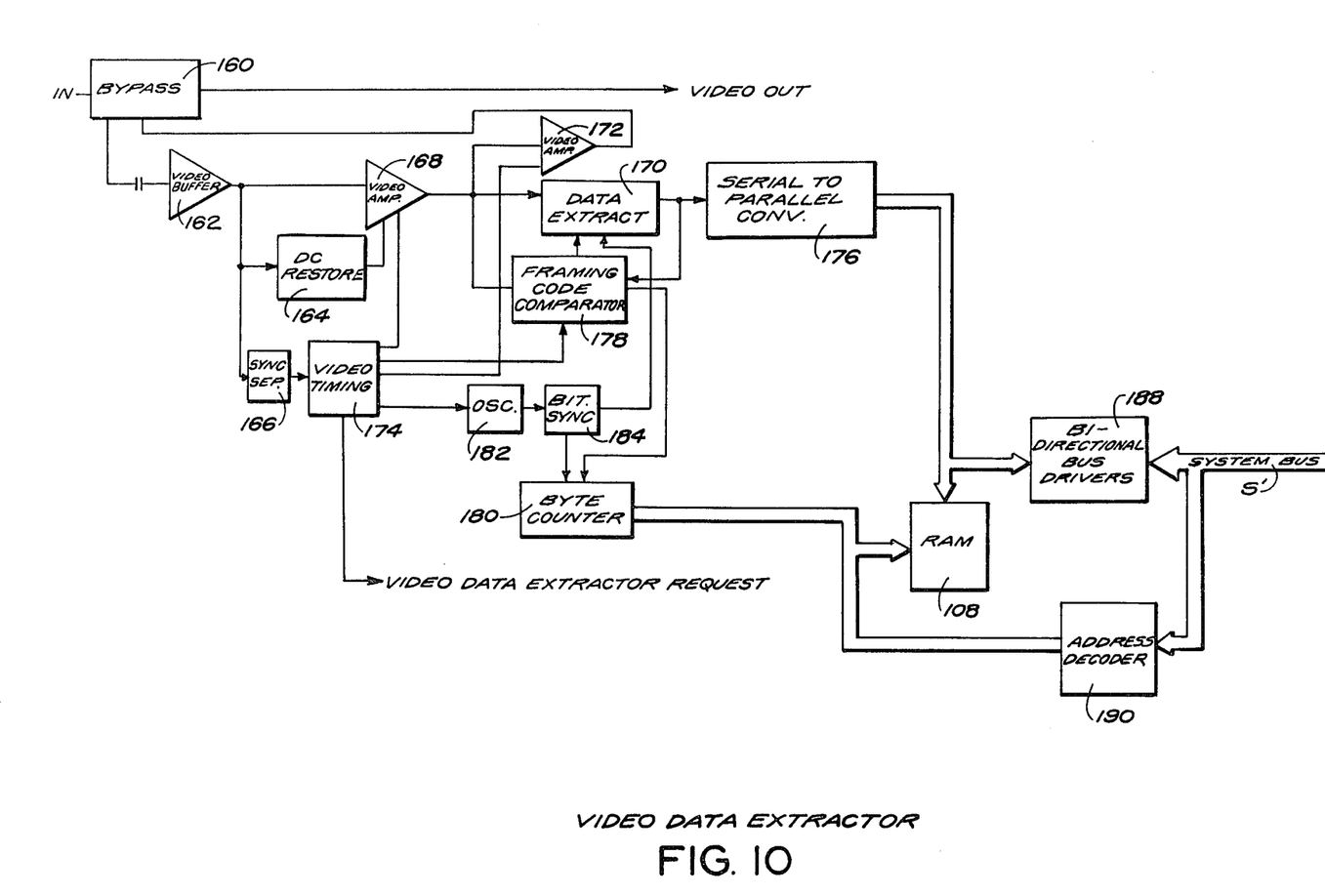
FIG. 10 is a block diagram of a data extractor included in the decoding system of FIG. 7.

The data extracting portion 102, shown in further detail in FIG. 10, receives the encoded video signal supplied by the system 10 of FIG. 1 after the encoded video signal has been transmitted directly by a cable (not shown) to the data extracting portion 102, or has been demodulated from an RF carrier originating from a television broadcast transmitter (not shown), removes the digital data which has been inserted into the scan lines of the video signal, and stores the data in a buffer RAM 108 so that the data can later be accessed by the data decoding processing portion 104 (FIG. 9).

The data decoding processing portion 104 then accesses the data stored in the RAM 108 through a decoding system bus S' and routes the data to a particular interface module 110 (FIG. 8), a number of which modules together form the output interface portion 106 of the decoding system 100.

The output interface modules, in turn, convert the data supplied to them to appropriate signal levels which correspond to the original data provided on each data input line I of corresponding input interface modules of the encoding system 10, and provide this information on an output data line O associated with each of the output interface modules 110 at the same rate that it was originally provided to the encoding system 10.

A comparison between the decoding system 100 with the encoding system 10 will show that they are substantially identical in their manner of operation, the only significant difference being that the data provided by the decoding system 100 flows out from an LSI interface adapter 112 and out of the line level converters 114 associated with each of the output interface modules 110, as opposed to data movement in the opposite direction. Further, the types of the devices which can be used in the decoding system 100 also correspond almost identically with the device types which can be used in the encoding system 10, except for the line level converter 114 which can be device type MC1488 instead of the type 1489 device specified for the line level converter 20 of the encoding system 10. This is only because of the reversed direction of data flow.

Bi-directional bus drivers 116 and an address decoder 118 operate to couple the system bus S' only with the LSI interface adapter 112 of the output interface module selected by the data decoding processing portion 104. The decoding processing portion 104 will then transmit the data it has obtained from the scan line of the encoded video signal to that output interface module when the module provides the decoding processing portion 14 with an interrupt which indicates that the module is ready to accept the next data character. The decoding processing portion 104 will then send the data to the LSI interface adapter 112 via the system bus S', and the data will be converted by the LSI interface adapter 112 to the correct format for the type of output device (not shown) which has been assigned to the output interface module 110. Depending on the device, the data may be provided in either serial or parallel form. LSI interface 112 then feeds the data in the proper format to the line level converter 114 to convert the data from TTL levels to RS 232, current loop, or any other desired type of line characteristic which the particular output device requires.

As in the encoding system 10, each output interface module 110 includes a bank of control switches 120a, 120b which define the "personality" of each interface module 110. The switches are used to select, inter alia, baud rate, number of bits per character, output line characteristic, and the like. The switches 120a, 120b are interrogated upon initializaton of the decoding processing portion 100 through the system bus S' and associated bus drivers 122a, 122b.

A baud rate selector 124, also coupled to the system bus S' and to LSI interface adapter 112 synchronizes the outgoing data so that it is provided to the output device associated with the module 110 at the same rate at which the data was supplied on the input data line I of the corresponding encoding module 18.

FIG. 9 shows the data decoding processing portion 104 in detail, this portion operating to retrieve data as it becomes available from the data extracting portion 102 (FIG. 10), and supply it to the particular output interface module 110 to which the data has been destined by, for example, the header information provided in the data by the encoding system 10. As the data is obtained from the extracting portion 102, it is stored in a RAM 130 of the decoding processing portion 104 and thereafter fed out from the RAM 130 at an appropriate rate into the system bus S'.

In further detail, a conventional microprocessor 132 such as, for example, Motorola type 6809 is supplied with clock pulses from a system clock 134. Upon receipt of an interrupt supplied through an interface adapter 136, microprocessor 132 accesses the RAM 108 of the data extracting portion 102, and transfers the data from the RAM 102 to the RAM 130 of the encoding processing portion 104. As each output interface module 110 requests, microprocessor 132 then transfers the data from the RAM 130 via the system bus S' to the requesting output interface module so that the data is provided at the rate at which it was originally received by the encoding system 10. A program ROM 140 coupled to the RAM 130 and the microprocessor 132 controls the operation of the microprocessor 132 so that the data is routed between the data extractor portion 102 and each output interface module 110 as desired.

Address drivers 142, bi-directional bus drivers 144, and control line drivers 146 coupled between the system bus S' and the microprocessor 132, enable the microprocessor buses to adequately handle the loading within the system. Baud rate generator 148 and baud rate drivers 150 provide appropriate clock signals to each output interface module 110 over the system bus S' to ensure that the correct data rates, as selected by the control switches 120a, 120b within each module 110, are provided out of the decoding processing portion 104.

Interface adapter 136 also serves to couple the status indicator 152 with the decoding processing portion 104, the indicator 152 showing data flow and error conditions that might exist within the processing portion 104. Further, control switches 154 are coupled to the interface adapter 136, the switches 154 being used to define the "personality" of the decoding processing portion 104.

When microprocessor 132 evaluates data received from the data extracting portion 102, it first responds to address bytes provided within the data by the encoding system 10 to determine whether or not that data was intended to be processed by the decoding processing portion 104. If it is not, the data is simply ignored. In the event the data was in fact destined to the processing portion 104, then microprocessor 132 proceeds with controlling the distribution of the data to the output interface module or modules specified within the data.

Referring to FIG. 10, it will be seen that the data extracting portion 102 is similar to the data inserting portion 16 of the encoding system 10, in the sense that it includes an analog area for handling the video processing aspects of the data extraction, and a digital area for removal of the data and its insertion into the RAM 108 for access by the decoding processing portion 104 of FIG. 9.

The encoded video signal is supplied first to a bypass 160 which serves the same purpose as the bypass 74 of the data inserting portion 16 of FIG. 6. That is, in the event the decoding system 100 malfunctions and distorts the incoming video signal, the extracting portion 102 is simply powered down and the bypass 160 will operate to feed the signal directly through the extracting portion 102.

Under normal operating conditions, the incoming encoded video signal is directed through the bypass 160 to be AC coupled to a video buffer amplifier 162. Amplifier 162 assures that the correct video level or amplitude is provided to the rest of the extracting portion circuitry.

The output of amplifier 162 is coupled to a conventional DC restorer circuit 164 which establishes the proper DC level into the incoming encoded video signal, regardless of the data or other information content of the signal. That is, even though the average level of the video signal may vary, a fixed, proper DC reference will be established by the DC restorer circuit 164.

The output of the buffer amplifier 162 is also coupled to a sync separator 166. This unit extracts the horizontal and vertical synchronization pulses from the video signal so that the decoding system 100 can synchronize itself to the incoming video signal to properly extract the inserted data.

The output of the buffer amplifier 162 additionally is coupled to another video amplifier 168 which assures that the encoded video signal is at a level which can be handled by data extraction circuitry 170 to which the amplifier 168 is coupled. Video amplifier 168 also has its output coupled to another video amplifier 172 which feeds the entire encoded video signal back out of the extracting portion 102 so that information or other data not extracted from the video signal by the extractor portion 102 is still present in the video output signal. Video amplifier 172 is gated by video timing logic 174 which gates amplifier 172 to an off state over that portion of the video signal in which the data being extracted has been inserted. That is, the data which was inserted by the encoding system 10 will be removed from the video output signal provided by the extractor portion 102 if the user provides such a request to the video timing logic 172.

The data extraction circuitry 170 may be conventional, and includes such analog and digital circuitry as may be required to recover the digital pulse stream inserted into the incoming encoded video signal. Data extraction circuitry 170 provides at its output a serial bit stream corresponding to that generated by the data inserting portion 16 of the encoding system 10. This serial bit stream is then fed to a serial-to-parallel converter 176 and to a framing code comparator 178 which defines or determines byte synchronization for the decoding system 100, that is, the time periods in which successive groups of extracted data bits correspond to individual ordered data bytes. Upon determining the byte synchronization, the framing code comparator 178 sends an appropriate control signal to a byte counter 180. Byte counter 180 is coupled to the RAM 108 of the extracting portion 102, and controls the storing of the parallel data provided by the serial-to-parallel converter 176 in the RAM 108. Once the extracted data is stored in RAM 108, an interrupt is generated to the decoding processing portion 104 signaling that the data is available for retrieval, so that the processing portion 104 can then extract the data from the RAM 108 and thereafter feed it at appropriate times to the output interface modules 110.

An oscillator 182 and bit sync circuitry 184 are coupled to the data extraction circuitry 170 and serve to lock the extraction circuitry 170 at an appropriate frequency so that the incoming data pulse stream can be sampled properly.

The video timing logic 174 is also coupled to the framing code comparator 178 and serves to establish time windows for the framing code comparator. The framing code should reside within a fixed time window within a video scan line in relation to the sync pulses of the video signal. Hence, if an appropriate framing code is not found within the prescribed time window, the data will be ignored by the decoding system 100.

The framing code comparator 178 may be one or a number of conventional devices including, for example, type 9324 or type 7495. Serial-to-parallel converter 176 can be, e.g., device type 7495.

Bi-directional bus drivers 188 and address decoder 190 serve to couple the extracting portion 102 with the system bus S', and it is through these devices that the decoding processing portion 104 accesses the RAM 108.

Figure 3:
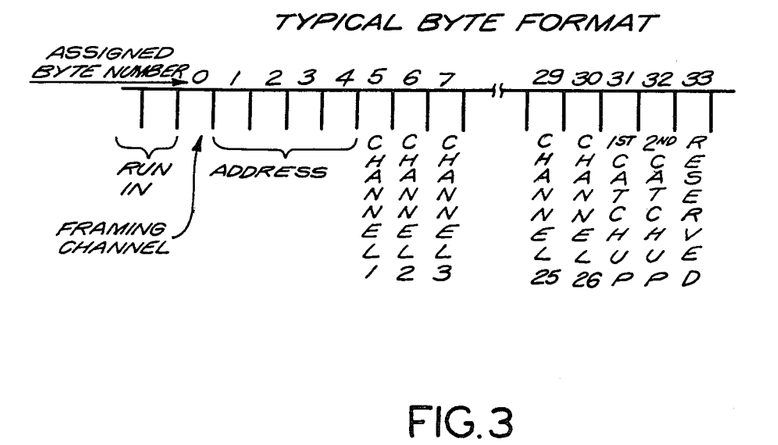
FIG. 3 is a representation of a typical format of data bytes included in the data packet of FIG. 2.

As shown in FIG. 2, a typical encoded video signal leaving the inserting portion 16 of the encoding system 10 contains a data packet. In one possible embodiment, the data packet contains 292 bits of data encoded in a non-return to zero (NRZ) manner derived from the encoding system clock 56 which operates at a frequency of 5.727272 MHz. This frequency is time related to that of the color burst by eight-fifths, assuming that the color video signal of FIG. 2 is to be encoded. Each data pulse or bit therefore is of a duration of 174.6 nanoseconds. For purposes of discussion, each group of eight successive data bits represents a data byte. With 292 bits in a data packet, there are 36.5 bytes to a data packet (i.e., N=36.5). The format of the bytes in the data packet is shown in FIG. 3. Again, the byte format of FIG. 3 represents one example of a format provided by the encoding system 10, and is not intended to limit the scope of the present invention from covering systems wherein equivalent formats are used. Also, the total number of bits in a data packet may be chosen as desired, 292 bits representing only one example wherein the bit count is related to the timing of the video signal scan lines.

In the byte format of FIG. 3, the first one and one-half bytes, i.e., 12 bits, are used to phase synchronize the decoding system clock 134. The second full byte is used to frame synchronize the data which follows on the scan line. The framing code is a unique sequence of bits which will be interpreted by the framing code comparator 178 much the same as the start bit in conventional asynchronous data transmission systems. The choice of the framing code should be such that it is possible for the data provided by the encoding system 10 to co-exist in a television signal where one or more other forms of data are inserted by various other encoding systems.

The following 33 bytes on the scan line contain certain data which may be organized according to the following positional dependent characteristics; the first four bytes are allocated to the packet header information which uniquely identifies the contents of the specific scan line, the following 26 bytes are identified as data channel bytes, the next two bytes are asynchronous catch-up bytes as defined below, and the last two bytes are reserved for future use.

The packet header information should include an address word to enable the decoding system 100 to differentiate between various other types of data encoded in other scan lines of the same video signal. The header information should also include a numerical cyclic indicator to determine if any particular packet has been lost. This indicator is incremented whenever data for a particular address is transmitted.

Each of the 26 data channel bytes define a unique data channel which is identified by its relative position as counted from the correct framing code. Assigning a value of zero to the framing code channel position, the first data channel is then in the fifth byte position, and subsequent channels are one byte position incremented beyond the fifth byte position to and including byte position 33. Importantly, the data contained in each of the 26 data channels of the data packet originates from a particular one or ones of the input modules 18 connected to the input devices, the number of data channels dedicated to a single input module (i.e., input device) being dependent on the information rate of the input device. Such allocation of the data channels is provided by the internal configuration of the encoding system ROM 42 which, together with the microprocessor 40 and the remaining components of the encoding system 10, operate to provide the data originating from each of the input devices at time corresponding to the sequential data bit time slots of the channel or channels dedicated to each of the data input modules 18.

Regarding the data channel capacity, each encoded scan line is capable of being uniquely associated with a particular scan line of one field of an interlaced television signal into which the encoded line is inserted. Using as a frame of reference the standard United States television system, each encoded line will appear once in each frame, or every 33.3667 milliseconds. Therefore, the maximum thruput rate for any channel associated with a single encoded line per frame is then 29.97 bytes per second. Recognizing that the standard transmission rates for data using typical RS 232 formats are 300, 600, 1200, etc. bits per second, with a 10 bit time byte, the byte repetition rate for a 300 bit per second line is $$1,000 \div 300 \times 10 = 33.333 \text{ milliseconds}$$

or 30 bytes per second.

Since the capacity of any given channel is slightly less than 30 bytes per second, the system 10 provides for the catch-up bytes mentioned above. This permits any data channel of the data packet to have a capacity of at least 30 bytes per second.

The achievable transmission thruput is the frame repetition rate of 29.97 bytes per second. A 30 byte per second input is then 0.03 byte per second fast. Therefore, each 1/0.03 = 33.33 seconds, the system 10 must add one catch-up byte. The maximum capacity of 26 data channels per scan line will then result in one catch-up byte being required in 33.33/26 = 1.282 seconds.

CATCH-UP BYTES (BYTES 31 AND 32)

The first of these two bytes is used to identify the channel that byte 32 is to be applied to.

Byte 31 is encoded with the binary value, from 1 to 26, which corresponds to the channel number.

| b7 | b6 | b5 | b4 | b3 | b2 | b1 | b0 |
|----|----|----|----|----|----|----|----|
| P | 0 | 0 | | BINARY CHANNEL # | | | |

Bits b5 and b6 of this byte are always in the zero state.
Bit b7 of byte 32 is the odd parity bit.
Bit b0 is the least significant bit of the channel number.

If there is no catch-up required in this packet for any channel, the bits b0 through b4 will all be zero.

If byte 31 contains the code for a valid channel, then byte 32 is to be interpreted as an additional byte to be appended to the data stream associated with the identified channel after the byte in the normal position for that channel has been re-transmitted by the decoder on the designated port.

If byte 31 contains all zeros (except for parity) or any code recognized as an invalid code, then byte 32 is ignored.

BYTES 33 AND 34

These bytes are currently not implemented, however, they will be implemented in the future as a CRC of the information contained in bytes previously numbered 1 through 32.

The CRC generator polynominal to be used will be the CRC-16 described in "Technical Aspects of Data Communications", John E. McNamara, Digital Equipment Corp., 1977, page 155.

$$CRC-16 = X^{16} + X^{15} + X^2 + 1$$

The purpose of implementing this CRC function is to make a decision to discard the entire packet in the event of errors.

These bytes are not implemented as further technical and field test information is necessary to determine their usefulness.

The input devices connected with the input data modules 18 may include conventional teletypewriters, video terminals for displaying and transmitting characters or graphic data, computer output terminals, digital telephone devices, and the like. A typical information rate range for the input devices which can be handled by the input modules 18 is from 110 to 4,800 baud. The formats of the data supplied by the input devices may also differ from one another and include such formats as ASCII, and require any one of a number of interfaces such as EIA RS 232C, 20 ma current loop, 60 ma unipolar, or parallel byte transfer TTL levels.

For purposes of explanation, and without intending to limit the scope of the present invention, the following operational example for the encoding system 10 and the decoding system 100 is given.

For purposes of this example, it will be assumed that a relatively common input device such as a standard 300 baud computer type terminal transmitting in a conventional 8 bit ASCII code, is connected to one of the data input interface modules 18 of the encoding system 10. It is also assumed that data channel 2 (FIG. 3) has been dedicated to the interface module 18 connected with the computer terminal. Since the user might type on the terminal, it is further assumed that the terminal would provide the typed characters bit by bit at the 300 baud rate.

As each character is provided at the terminal output, the associated interface module 18 would receive the data through its line level converter 20 into the LSI interface adapter 22. When the interface adapter 22 recognizes that a valid character has been received, it generates an interrupt through the system bus S which flags the encoding processing portion 14 (FIG. 5) that data is now available for transmission from the output of the interface portion 12. Upon receipt of this interrupt, microprocessor 40 within the encoding processing portion 14 then accesses the LSI interface adapter 22 through the bi-directional bus driver 24 and address decoder 26 to acquire the character data that is held in the interface adapter 22 and transfers that data to the RAM 44 of the encoding processing portion 14.

Microprocessor 40 maintains this data in the RAM 44 until it receives an interrupt from the data inserting portion 16 (FIG. 6). Upon receipt of this interrupt or request from the inserting portion 16, the microprocessor 40 removes the data from the RAM 44 and places it, through the address drivers 46 and bi-directional bus drivers 48, in a certain position within the RAM 70 of the inserting portion 16 for transmission within the time frame of the scan line which corresponds to channel 2.

The data inserting portion 16 (FIG. 6) then waits until the next field within the video signal into which the data is to be inserted. Once this field is detected, the inserting portion 16 counts the scan lines within the video signal until the line selected for data insertion appears. At that time, the data is inserted as previously described within the selected scan line. This data appears in the data bit time slots allocated to data channel 2, which is the sixth data byte after the framing channel as shown in FIG. 3. The video output signal from the inserting portion 16 then corresponds to the incoming video signal with the character data now riding "piggy back" on it, for example within the scan line 16 which is located within the vertical blanking intervals of standard television broadcast signals. This encoded video signal would then be transmitted via satelite or microwave link, or by other means (e.g., cable) to a point where a decoder such as the decoding system 100 of FIG. 7 would receive it.

When the encoded video signal has been received and, if necessary, demodulated from any RF carrier by a conventional television receiver, the video signal is directed to the extracting portion 102 (FIG. 10) of the decoding system 100. Extracting portion 102 first determines when it is receiving the field of the video signal within which the data is inserted, and then it counts the scan line within that field until line 16 begins. Upon receiving scan line 16, the extracting portion 102 synchronizes its clock oscillator 182 to the encoded video signal so that it can then recognize the framing code inserted on the line to obtain byte synchronization.

The data extracting portion 102 then removes all of the data inserted on scan line 16 and stores it in the RAM 108. After the data has been stored, an interrupt is generated and sent through the system bus S' to inform the decoding processing portion 104 that the data is stored in the RAM 108 and is available to be processed. Processing portion 104 then addresses the RAM 108 and transfers the data from RAM 108 to the RAM 130 within the decoding processing portion 104 (FIG. 9).

Decoding processing portion 104 then evaluates the data, including a determination of whether or not the data was intended to be processed by the decoding system 100. Assuming that it was, the data is then distributed to whatever output interface module of the output interface portion 106 which has been assigned or dedicated to handling data inserted within data channel 2. The fact that the data was inserted in data channel 2 was established by the fact that it was located in the sixth byte position after the framing channel, as explained above.

Decoding processing portion 104 transfers the extracted data to the output interface module 110 which has been assigned to an output port corresponding to data channel 2. The LSI interface adapter 112 is addressed by the processing portion 104 through the system bus S' and the extracted data now contained in the RAM 130 of processing portion 104 is then transferred to the LSI interface adapter 112. This transfer occurs at a time when interface adapter 112 generates an interrupt to request an additional byte of data for the output interface module with which the interface adapter 112 is associated. Once the data has been transferred to the interface adapter 112, the adapter thereafter clocks the data out in a serial stream which, in the present example, is at a 300 baud rate. This data stream is fed to the line level converter 114 for conversion to a standard RS 232 level.

LSI interface adapter 112 also operates to re-insert the start and stop bits present in a standard ASCII line format, these bits having been stripped by the LSI interface adapter 22 of the encoding system 10 into which the data from the computer terminal was entered. Once this complete data byte has been shifted out, the interface adapter 112 then generates another interrupt or request back down through the system bus S' for the next data group or byte that should follow the one which was just extracted and decoded.

Assuming that there is a receiving terminal (not shown) coupled to the output line 0 of the output interface module 110, and the receiving terminal displays the information provided to it over the output line 0, an operator would see the same informtion which was transmitted from the computer terminal at the encoding system end, with a slight time delay due to the propagation time for information to be conveyed over the actual distance between the encoding system 10 and the decoding system 100. This propagation delay also depends on the type of transmission system used, i.e., satellite, microwave link, or the like, and the distances traveled by the signals through all the various portions of the transmission system. This delay typically might be on the order of 1 or 2 seconds, at most.

When considering the encoding system 10 and the decoding system 100 as a complete, transparent data transmission system, it is useful to define a data port as a serial or parallel input/output pair. The output characteristics of a port on a given output interface module of the decoding system 100 should always be identical to the input characteristics of the port on the corresponding input interface module of the encoding system.

The characteristics of these ports are predetermined by the specific hardware configuration assigned to the ports at the time of installation of the encoding and decoding systems.

Implementation of a port may require the use of only a part of a single data channel, a full data channel or multiple channels. In the case of a single data channel being assigned to one port, the maximum achievable data rate is 300 bits per second as explained earlier. Implementation of a port with a data rate in excess of 300 bits per second can be achieved by using multiple data channels. The number of channels required is then given by $D \div 300 =$ number of channels where D is the data rate in bits per second of the desired port. For example, to implement a 1,200 bit per second port, would require $1,200 \div 300$ or four channels By utilizing the data channel capacity of an entire scan line to implement one port, the maximum data rate would be $26 \times 300 = 7,800$ bits per second The next lowest standard data rate would be 4,800 baud.

Implementation of a port with a data rate less than 300 bits per second and a maximum of six transparent bits can be implemented by dividing a channel into sub-channels. As the only common uses for data rates less than 300 bits per second, except for 10 byte per second teletype, is in Baudot coded or TTS coded applications, it is possible to identify sub-channels within a channel by using the high order bits of the byte as identifiers. For example, for ports using five level Baudot codes and data speeds no greater than 10 bytes per second, up to three ports can be provided in one channel. For ports using six level coding and data speeds no greater than 15 bytes per second, up to two ports can be provided.

Both the encoding and decoding systems of the present invention are capable of implementing ports with speeds in excess of 7,800 bits per second by assigning data channels from more than one encoded scan line to a port. For example, implementation of a 19.2 kilobaud port would require the use of 64 data channels and, since a typical formt includes 26 channels per line, two fully encoded scan lines and an additional 12 data channels on a third scan line would be required.

While the foregoing description and drawing represent the preferred embodiments of the present invention, it will be obvious to those skilled in the art that various changes and modifications may be made therein without departing from the true spirit and scope of the present invention.

What is claimed is:

1. A system for encoding data to be transmitted along with an incoming television video signal of a given field rate, wherein a predetermined number of scan lines compose each field, comprising:
input interface means for receiving data from a number of input devices each of which provides data at a particular information rate;
encoding processing means coupled to said input interface means for accessing the data received by said input interface means from the input devices and for arranging the data into separately identifiable data groups, each of said data groups corresponding to the input device which originated the data in that group; and
inserting means coupled to said encoding processing means and to the incoming video signal for accessing said data groups from said encoding processing means and for inserting said data groups into a selected scan line of the video signal, said inserting means including timing means for providing timing signals to define a number of data channels over a portion of said selected scan line, said inserting means operating to insert each of said data groups into an associated data channel so that said data channels on said selected scan line include data which originates from the number of input devices, the amount of data identifiable with a particular input device corresponding directly to the particular information rate of the input device.

2. A system for encoding data to be transmitted along with an incoming television video signal of a given field rate, wherein a predetermined number of scan lines compose each field, comprising:
input interface means for receiving data from a number of input devices each of which provides data at a particular information rate;
encoding processing means coupled to said input interface means for accessing the data received by said input interface means from the input devices and for arranging the data into separately identifiable data groups, each of said data groups corresponding to the input device which originated the data in that group; and
inserting means coupled to said encoding processing means and to the incoming video signal for accessing said data groups from said encoding processing means and for inserting said data groups into a selected scan line of the video signal, said inserting means including timing means for providing timing signals to define a number of data channels over a portion of said selected scan line, said inserting means operating to insert each of said data groups into an associated data channel wherein any selected one of said data channels on said selected scan line includes data which originates from a particular input device,
wherein said timing signals provided by said timing means operate to define at least one catch-up channel over a portion of said selected scan line, said inserting means being operative to insert the latest data group containing data from a certain input device into said catch-up channel when the latest data group exceeds the amount of data which can be inserted by said inserting means into the data channel associated with the certain input device.

3. A system according to claim 2, wherein said input interface means includes a number of input interface modules each associated with a different one of the input devices, each of said input interface modules including an interface adapter for storing the data from an associated input device and for providing the data to said encoding processing means in response to a request signal from said encoding processing means.

4. A system according to claim 2, including means for bypassing the incoming video signal through said inserting means in response to a malfunction arising in said system which otherwise would distort the incoming video signal.

5. A system according to claim 2, wherein said inserting means includes means for counting successive scan lines of the incoming video signal and for generating a flag signal at a time corresponding to the beginning of said selected scan line.

6. A system according to claim 5, wherein said inserting means further comprises address data means responsive to said flag signal for inserting address information into certain ones of said data channels.

7. A system according to claim 6, wherein said address data means comprises a read only memory.

8. A system according to claim 5, wherein said inserting means further comprises storage means for storing said data groups from said encoding processing means and for supplying said data groups for insertion into said selected scan line in response to said flag signal.

9. A system according to claim 8, wherein said storage means comprises a random access memory.

10. A system according to claim 2, wherein said encoding processing means comprises a random access memory, and means for entering the data received by said input interface means in said random access memory.

11. A system according to claim 2, wherein said encoding processing means includes a random access memory, and means for entering the data provided by each said interface adapter in said random access memory.

12. A system according to claim 2, wherein said encoding processing means includes a clock for generating pulses operative to control the timing of operations carried out by said encoding processing means, said pulses having a frequency which is functionally related to a portion of the incoming video signal.

13. A system according to claim 2, wherein said timing signals provided by said timing means of said inserting means operate to define an identifying data channel over a portion of said selected scan line, said inserting means being operative to insert data into said identifying data channel which data identifies the data channel to which the latest data group inserted into said catch-up channel corresponds.

14. A system according to claim 2, wherein said timing means is arranged to provide said timing signals so that said number of data channels are defined over portions of a plurality of selected scan lines, and said inserting means operates to insert each of said data groups into different data channels of said plurality of selected scan lines.

15. A system according to claim 2, wherein said inserting means is arranged to insert data originating from a plurality of different ones of the input devices into a common data channel on said selected scan line.

16. A communications system in which data to be transmitted is encoded within a television video signal of a given field rate, wherein a predetermined number of scan lines compose each field, comprising:
input interface means for receiving data from a number of input devices each of which provides data at a particular information rate;
encoding processing means coupled to said input interface means for accessing the data received by said input interface means from the input devices and for arranging the data into separately identifiable data groups, each of said data groups corresponding to the input device which originated the data in that group;
inserting means coupled to said encoding processing means and to the television video signal for accessing said data groups from said encoding processing means and for inserting said data groups into a selected scan line of the video signal to provide an encoded video signal comprising the television video signal and the inserted data groups, and first timing means for providing first timing signals to define a number of data channels over a portion of said selected scan line, said inserting means operating to insert each of said data groups into an associated data channel to form said encoded video signal so that said data channels on said selected scan line include data which originates from the number of input devices, the amount of data identifiable with a particular input device corresponding directly to the particular information rate of the input device; and
transmission means coupled to said inserting means for transmitting said encoded video signal over a desired transmission path.

17. A communications system according to claim 16, wherein said transmission means comprises a coaxial cable.

18. A communications system according to claim 16, wherein said transmission means comprises a television transmitter.

19. A communications system according to claim 16, including a satellite which forms part of the desired transmission path.

20. A communications system according to claim 16, further comprising:
output interface means for providing data obtained from the inserted data groups of said encoded video signal to a number of output devices each of which responds to data at a particular information rate;
extracting means for receiving said encoded video signal transmitted from said transmission means and for extracting the inserted data groups from said selected scan line, said extracting means including second timing means for providing second timing signals in corresponding relationship with said number of data channels over said selected portion of said selected scan line so that each of the extracted data groups corresponds to an identifiable data channel; and
decoding processing means coupled to said extracting means and said output interface means for accessing the extracted data groups from said extracting means and for distributing the data to said output interface means.

21. A communications system according to claim 20, wherein said output interface means includes a number of output interface modules each associated with a different one of the output devices, each of said output interface modules including an interface adapter for storing the data distributed by said decoding processing means and for providing the data to an associated output device.

22. A communications system according to claim 16, wherein said inserting means is arranged to insert data originating from a plurality of different ones of the input devices into a common data channel on said selected scan line.

23. A method of encoding data into a television video signal of a given field rate supplied at a first location, and decoding the video signal to obtain the encoded data at a second location, comprising the steps of providing a television video signal at the first location, providing data to be encoded to the first location from a number of input devices each of which operates at a particular information rate, arranging the data from the input devices into separate groups, identifying each of the groups with the input device which originated the data in each group, selecting a scan line of the video signal provided at the first location, defining a number of data channels over a portion of the selected scan line, inserting the data groups into associated data channels of the selected scan line thereby forming an encoded video signal, defining at least one catch-up channel over a portion of the selected scan line, determining when the latest data group identified with a particular input device exceeds the amount of data which can be inserted during said inserting step into the data channels associated with the latest data group, inserting the excess data contained in the latest data group into the catch-up channel, transmitting the encoded video signal to the second location, extracting at the second location the data groups from their associated data channels, identifying each of the extracted data groups with a particular output device which responds to a particular information rate, and providing the data from the extracted data groups to the identified output devices at corresponding information rates.

24. The method of claim 23, wherein said transmitting step includes receiving the encoded video signal by a satellite at a third location, and retransmitting the encoded video signal from the satellite to the second location.

25. The method of claim 23, including extracting at the second location the excess data from the catch-up channel, identifying a particular output device with the excess data, and providing the excess data to the output device identified with the excess data at a corresponding information rate.

26. The method of claim 23, including inserting at the first location data originating from a plurality of different ones of the input devices into a common data channel on the selected scan line.

27. The method of claim 26, including extracting at the second location the data from the common data channel, identifying a plurality of different ones of the output devices with the data extracted from the common data channel, and selectively providing the data extracted from the common data channel to the identified output devices at corresponding information rates.

28. A system for decoding data which is encoded in a certain scan line of a transmitted television video signal wherein the data originates from a number of input devices each of which operates at a particular information rate, and groups of data identifiable with the input devices are inserted into associated data channels defined over selected portions of the scan line, comprising:

output interface means for providing data obtained from the groups of data inserted into the associated data channels to a number of output devices each of which responds to data at a particular information rate;

extracting means for receiving the transmitted television signal and for extracting the groups of data from the certain scan line, said extracting means including timing means for providing timing signals in corresponding relationship with the associated data channels of the scan line so that each of the extracted groups of data corresponds to an identifiable data channel; and decoding processing means coupled to said extracting means and said output interface means for accessing the extracted groups of data from said extracting means and for distributing the data to said output interface means so that the amount of data distributed for each of the output devices corresponds directly to the particular information rate of the output device.

29. A system according to claim 28, wherein said output interface means includes a number of output interface modules each associated with a different one of the output devices, each of said output interface modules including an interface adapter for storing the data distributed by said decoding processing means and for providing the data to an associated output device.

* * * * *